US012547921B2

(12) United States Patent
Kaushik

(10) Patent No.: US 12,547,921 B2
(45) Date of Patent: Feb. 10, 2026

(54) CHANGE DETECTION IN IMAGES USING QUANTUM COMPUTERS

(71) Applicant: IonQ, Inc., College Park, MD (US)

(72) Inventor: Ananth Prakash Kaushik, Santa Clara, CA (US)

(73) Assignee: IonQ, Inc., College Park, MD (US)

( * ) Notice: Subject to any disclaimer, the term of this patent is extended or adjusted under 35 U.S.C. 154(b) by 294 days.

(21) Appl. No.: 18/496,328

(22) Filed: Oct. 27, 2023

(65) Prior Publication Data

US 2025/0139479 A1 May 1, 2025

(51) Int. Cl.
*G06N 10/40* (2022.01)
*G06N 10/20* (2022.01)

(52) U.S. Cl.
CPC ............ *G06N 10/40* (2022.01); *G06N 10/20* (2022.01)

(58) Field of Classification Search
CPC ......... G06N 10/40; G06N 10/20; G06N 10/00
See application file for complete search history.

(56) References Cited

U.S. PATENT DOCUMENTS

2020/0104740 A1* 4/2020 Cao .................. G06N 10/60
2020/0210755 A1* 7/2020 Luongo ............ G06N 20/00
2021/0383189 A1* 12/2021 Cong ................ G06N 3/0464

OTHER PUBLICATIONS

Written Opinion received for PCT Patent Application No. PCT/US2024/052796, Mailed on Jan. 17, 2025, 6 pages.
Yan et al., "Assessing the similarity of quantum images based on probability measurements", In Proceedings of IEEE Congress on Evolutionary Computation (CEC), Jun. 10, 2012, pp. 1-6.
Le et al., "A flexible representation of quantum images for polynomial preparation, image compression, and processing operations", Quantum Inf Process, 2011, vol. 10, pp. 63-84.
Amankwah et al., "Quantum pixel representations and compression for N-dimensional images", Scientific reports, 2022, vol. 12, No. 7712, 15 pages.
Childs et al., "Hamiltonian Simulation Using Linear Combinations of Unitary Operations", 2012, arXiv:1202.5822v1 [quant-ph], 18 pages.

* cited by examiner

*Primary Examiner* — Benjamin O Dulaney
(74) *Attorney, Agent, or Firm* — ARENTFOX SCHIFF LLP

(57) ABSTRACT

Aspects of the present disclosure relate generally to systems and methods for detecting change in images using a quantum information processing (QIP) system. The method includes implementing a quantum circuit in the QIP system, the quantum circuit comprising at least an ancilla qubit denoted as |a> and qubits denoted as image qubit conditions on a |0> state and a |1> state of the ancilla qubit |a>. The method also includes loading a reference image and a test image onto image qubits controlled on the |0> state and the |1> state of the ancilla qubit |a> in the quantum circuit. The method further includes determining a state of the image qubits after measuring |1> on the ancilla qubit for a predetermined number of times, wherein the reference image is detected to be different from the test image when the state of the ancilla qubit measures |1>.

20 Claims, 12 Drawing Sheets

US 12,547,921 B2

CHANGE DETECTION IN IMAGES USING QUANTUM COMPUTERS

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure overcome the above-stated problems and other shortcomings with this approach.

This disclosure describes various aspects of techniques for detecting a chance between two images (e.g., a reference image and a test image) using a quantum computer.

In an aspect of this disclosure, a method for detecting change between images is described. The method includes implementing a quantum circuit in the QIP system, the quantum circuit comprising at least an ancilla qubit denoted as |a> which is put into a uniform superposition using a Hadamard gate and n number of qubits denoted as image qubits conditions on a |0> state and a|1> state of the ancilla qubit |a>, wherein n corresponds to ceil(log 2(N))+1 and N corresponds to a total number of pixels in a reference image, wherein the image qubits are divided into a first subset to represent pixels of images along an X axis and a second subset to represent the pixels along a Y axis. The method also includes loading the reference image and a test image onto the image qubits controlled on the |0> state and the |1> state of the ancilla qubit |a> in the quantum circuit such that pixels from the reference and test images are loaded in superposition, wherein another Hadamard gate is added after loading the reference and test images on the ancilla qubit.

The method finally includes determining a state of the image qubits after measuring |1> on the ancilla qubit for a predetermined number of times on multiple copies of the implemented quantum circuit, wherein the reference image is detected to be different from the test image when the state of the ancilla qubit measures |1>.

In an aspect of this disclosure, a system configured to detect changes in images is described. The system includes a change detection component configured to control one or more components of the QIP system to: implement a quantum circuit in the QIP system, the quantum circuit comprising at least an ancilla qubit denoted as |a> which is put into a uniform superposition using a Hadamard gate and n number of qubits denoted as image qubits conditions on a |0> state and a|1> state of the ancilla qubit |a>, wherein n corresponds to ceil(log 2(N))+1 and N corresponds to a total number of pixels in a reference image, wherein the image qubits are divided into a first subset to represent pixels of images along an X axis and a second subset to represent the pixels along a Y axis; load the reference image and a test image onto the image qubits controlled on the |0> state and the |1> state of the ancilla qubit |a> in the quantum circuit such that pixels from the reference and test images are loaded in superposition, wherein another Hadamard gate is added after loading the reference and test images on the ancilla qubit; and determine a state of the image qubits after measuring |1> on the ancilla qubit for a predetermined number of times on multiple copies of the quantum circuit, wherein the reference image is detected to be different from the test image when the state of the ancilla qubit measures |1>.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
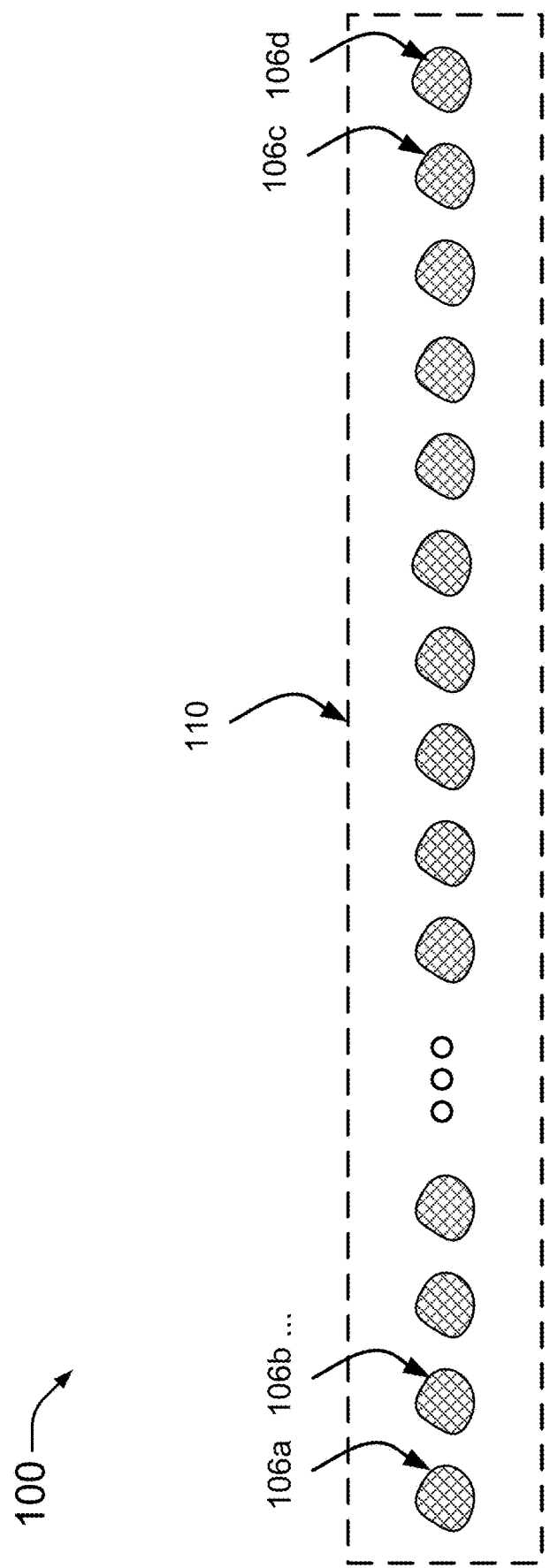
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

There may be many different reasons for wanting to detect a change between two images. As an example, in military applications, military satellites may perform reconnaissance by passing over enemy ground and taking aerial photos of different terrain to locate enemy troops or track enemy troop movement. This may be accomplished by taking photos of a same area of land at different intervals of time to see whether there are any differences in the photos which may reveal information about enemy troop movement or location. In environmental applications, there may be a satellite that takes an image of a certain region (e.g., coral reef, rainforest, etc.) and takes an image of the same region at a later point in time to see if there have been any changes. This would help detect climate anomaly and track environmental damage in a particular area. As another application, detecting a change between two images may be useful for facial recognition purposes.

Quantum image processing is a method employed for processing images using quantum information technology. Quantum image processing ensures time efficient management of simple operations used in classical image processing.

The present disclosure describes detecting a change between two images using a quantum computer. A quantum computer contains a very large, embedded space to manipulate these images quickly and simultaneously. There are many advantages to using a quantum computer when detecting change in two images. For example, quantum computers may utilize a very large Hilbert space to encode image data and features in an image data. A Hilbert space is a mathematical representation of all possible states that a quantum system can take. In addition, quantum computers can process large amounts of data in parallel using a principle of superposition. Superposition is the ability of a quantum system to be in multiple states at the same time until its measured.

As described herein, trapped atomic ions is an example of quantum information processing approach that has delivered fully programmable machines. In trapped ion QIP, interactions may be naturally realized as extensions of common two-qubit gate interactions. Therefore, it is desirable to use entangling gates for efficient (e.g., reduced gate count) quantum circuit constructions to implement interactions in trapped ion technology. One particular interaction available in the use of trapped ions for quantum computing is the so-called Mølmer-Sørensen (MS) gate, also known as the XX coupling or Ising gate. To achieve computational universality, the Mølmer-Sørensen gate (either locally addressable or globally addressable) is complemented by arbitrary single-qubit operations, for example.

Using these principles, the exemplary system and method described herein provides for a configuration of a quantum circuit that has a plurality of qubits that model cognitive interference effects. In particular, the system and method includes applying a laser to an ion trap, which includes a plurality of qubits, to set a probability of a single event by rotating at least one qubit of the plurality of qubits to fix a relative angle of the at least one qubit. Moreover, the quantum circuit is configured by connecting a plurality of events, including the single event, such that an outcome of the single event dictates an output of a subsequent event of the plurality of events to be more or less likely to occur. Furthermore, the respective plurality of events are then entangled such that a plurality of states representing different potential events interfere with one another, including an interference between incompatible outcomes of at least two of the plurality of events. By doing so, the quantum circuit can be configured to measures the respective outcomes of the plurality of events to model a result when the quantum computer determines an outcome of at least one event of the plurality of events, such that possible outcomes of other events of the plurality of events are removed.

Figure 8:
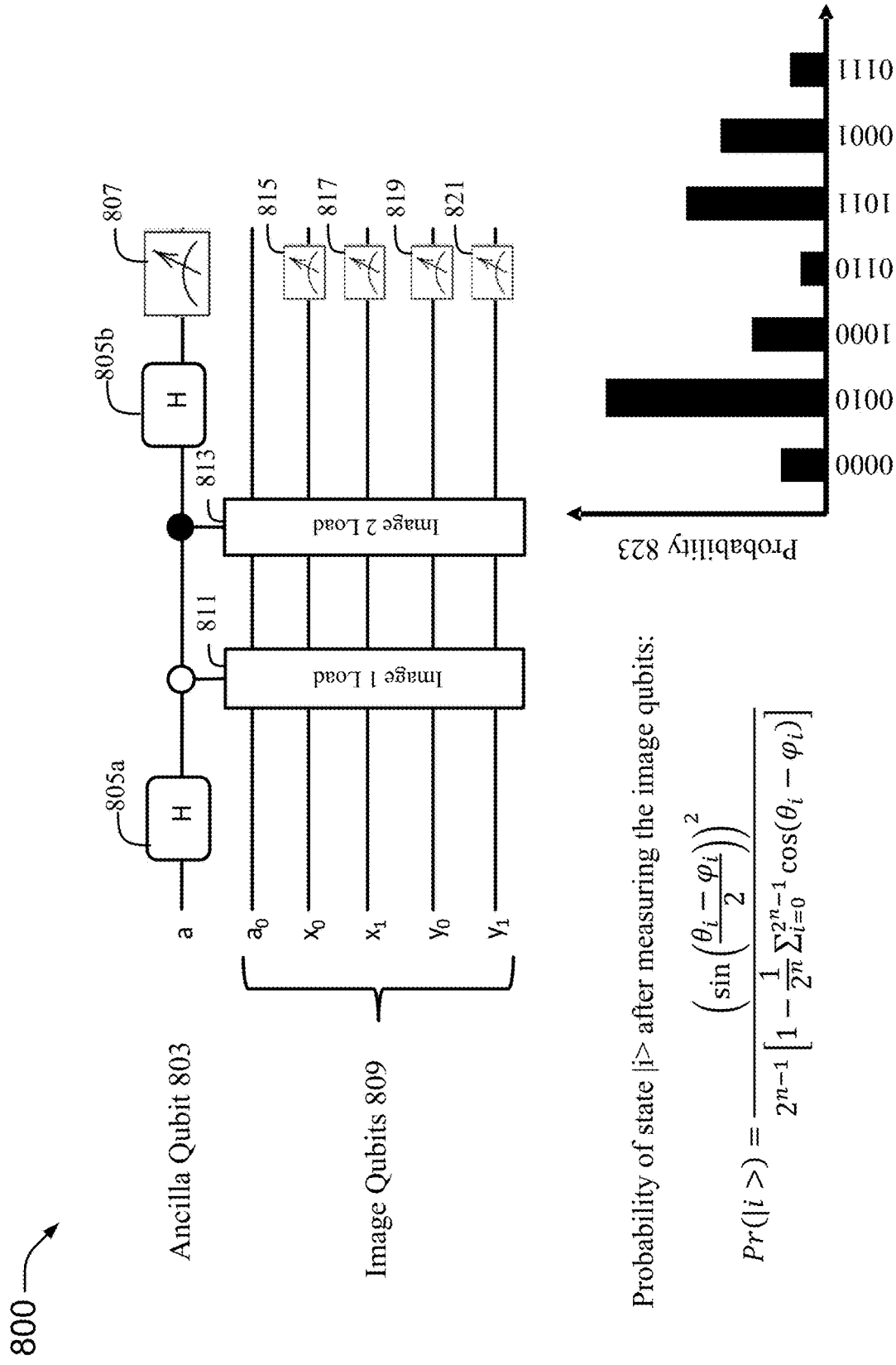
FIG. 8 illustrates an example of output probability distribution for detecting change in images using a quantum computer in accordance with aspects of this disclosure.
Figure 9A:
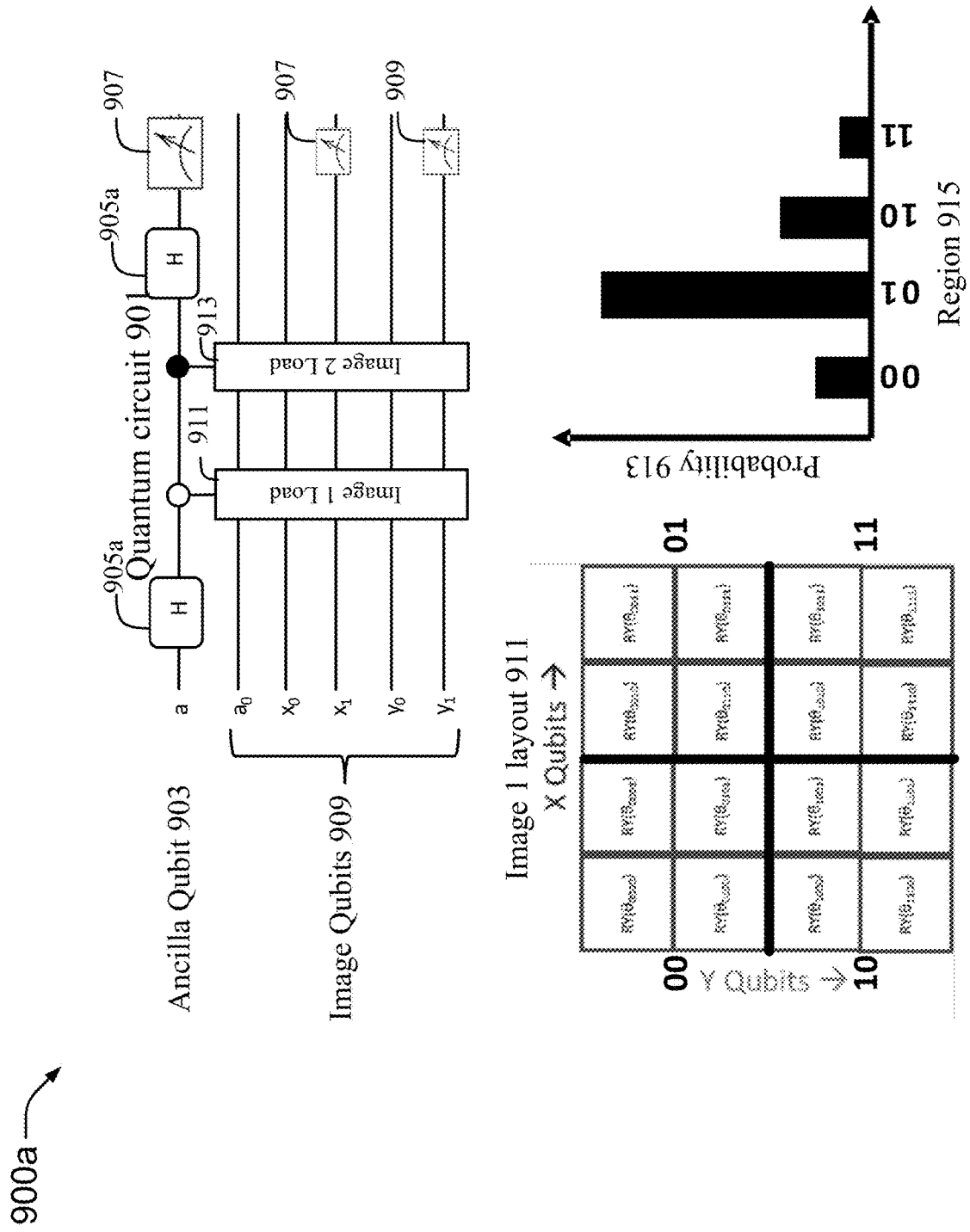
FIG. 9A illustrates an example of an output probability distribution for detecting change in images using a quantum computer in accordance with aspects of this disclosure.
Figure 9B:
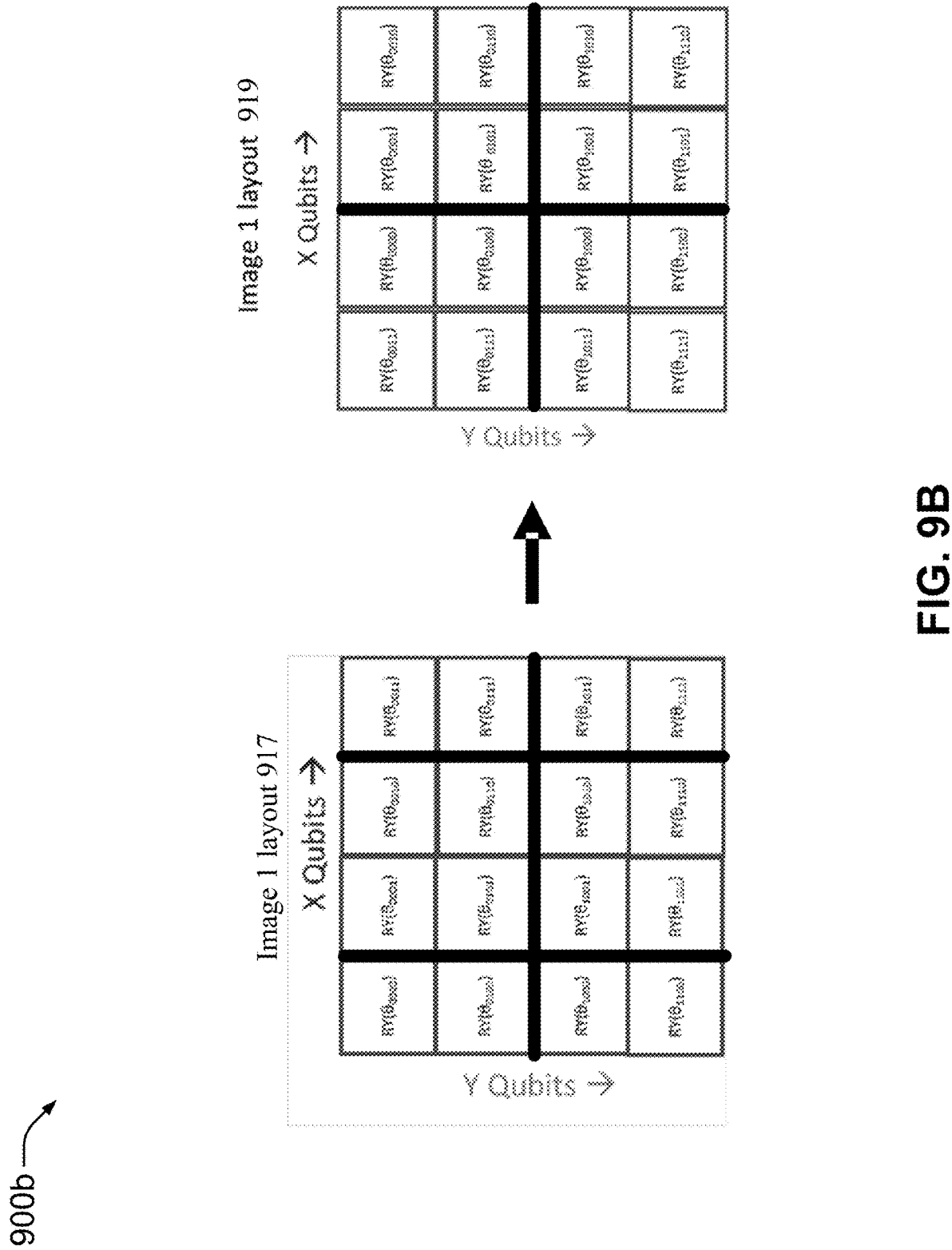
FIG. 9B illustrates an example of measuring regions that are not powers of two in accordance with aspects of this disclosure.
Figure 10:
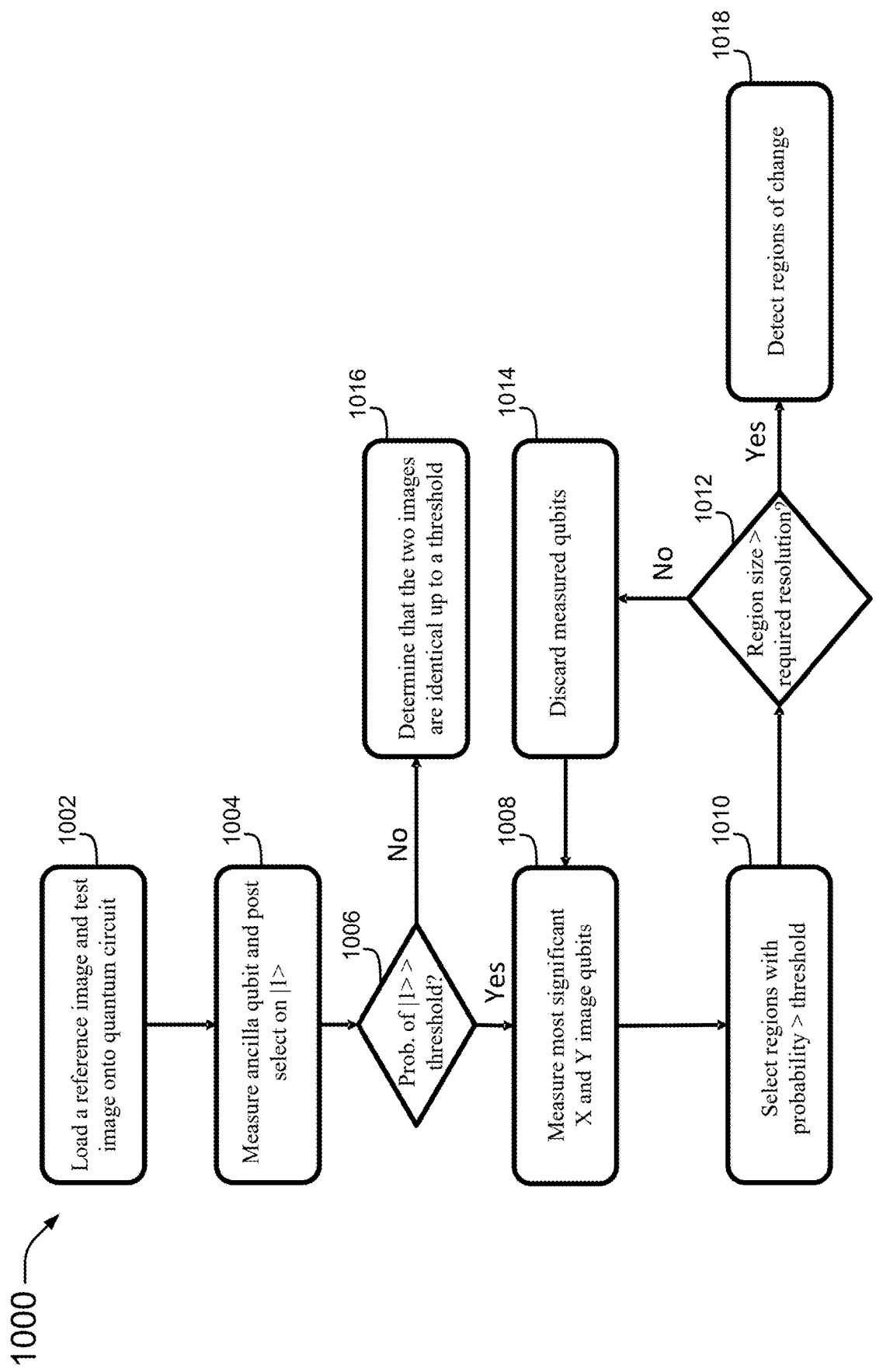
FIG. 10 illustrates a flowchart example of an example method of change detection in images using a quantum computer in accordance with aspects of this disclosure.
Figure 11:
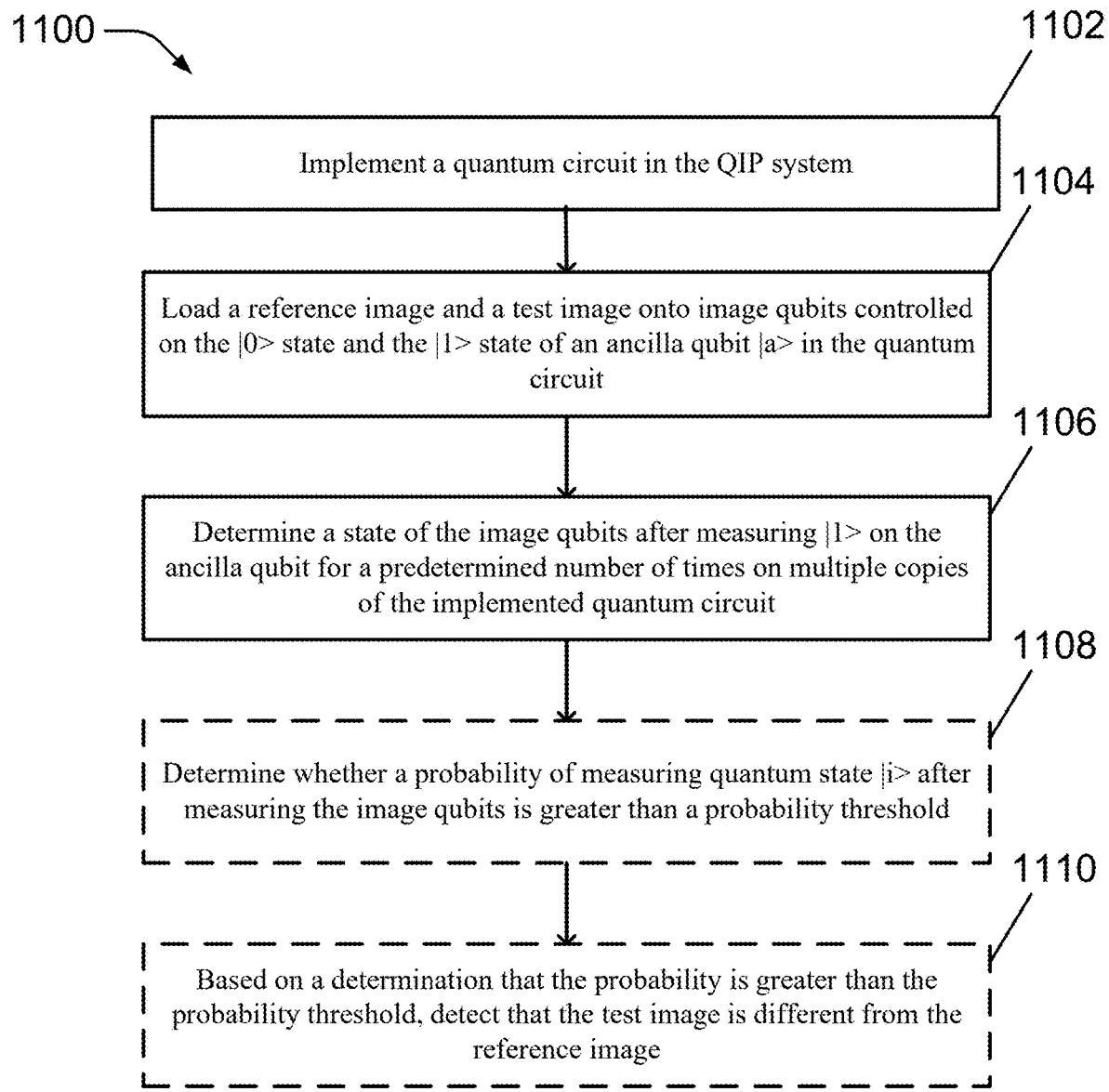
FIG. 11 illustrates a flowchart example of an example method of change detection in images using a quantum computer in accordance with aspects of this disclosure.

Solutions to the issues described above are explained in more detail in connection with FIGS. 1-11, with FIGS. 1-3 providing a general disclosure of quantum information processing (QIP) systems or quantum computers, and more specifically, of atomic-based QIP systems or quantum computers, FIGS. 4-9B provide descriptions and examples of detecting a change in images using a quantum circuit, and FIGS. 10-11 provide flowcharts for detecting a change in images using a quantum circuit, in accordance with various example aspects of the present disclosure.

Figure 2:
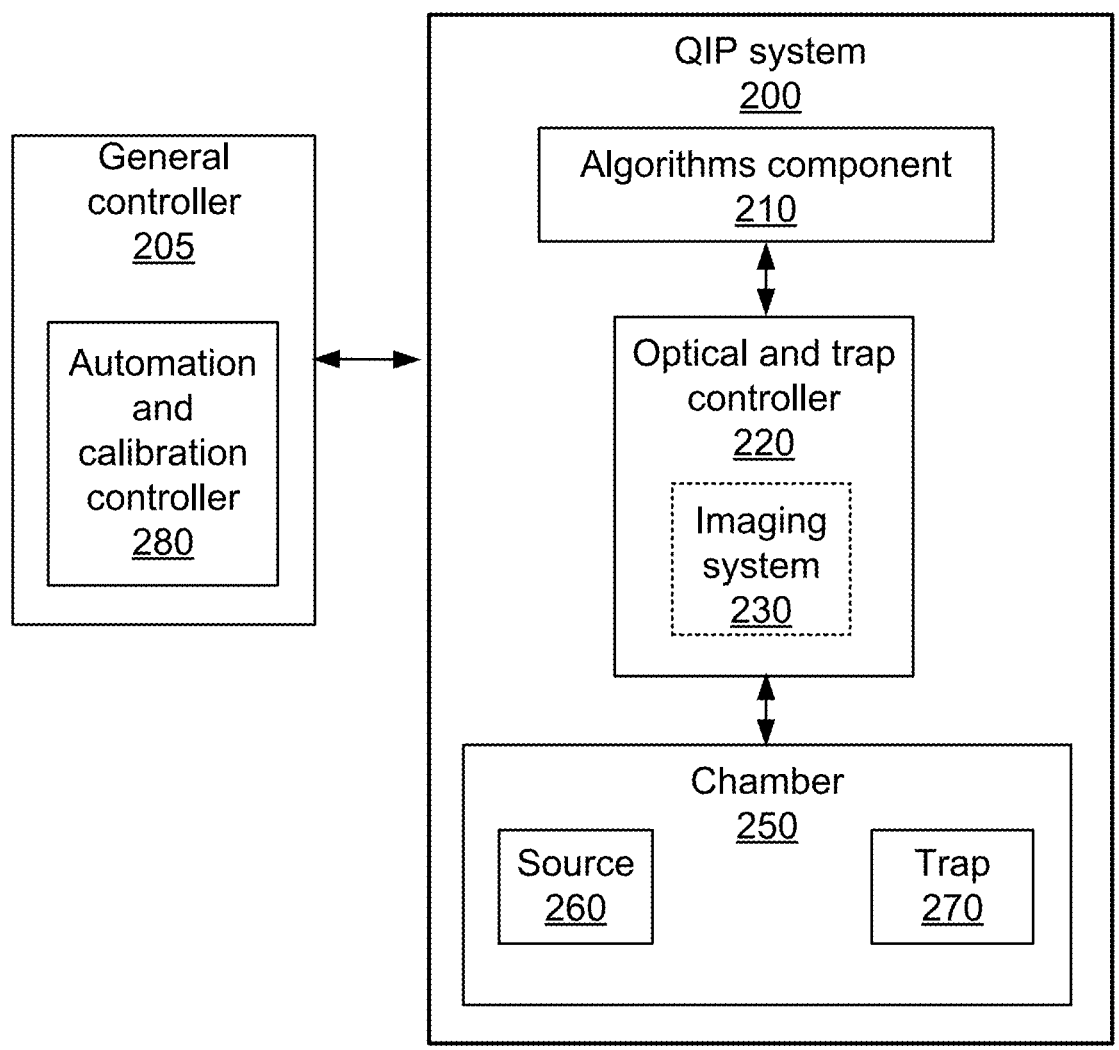
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, ..., 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (m)

from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

The chain 110 of ions 106 may be part of a QPU, that is, the chain 110 of ions 106 may be part of a processing engine or processing core of a QIP system. When any one of the ions 106 is capable of being connected to any other ion 106 in the chain 110, the chain 110 is considered to be fully connected, and thus, it can be used to implement a fully connected QPU. Fully connected QPUs need not be limited to atomic-based QIP systems.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using one or more of the general controller 205, the automation and calibration controller 280, the optical and trap controller 220, and the chamber 250.

Figure 3:
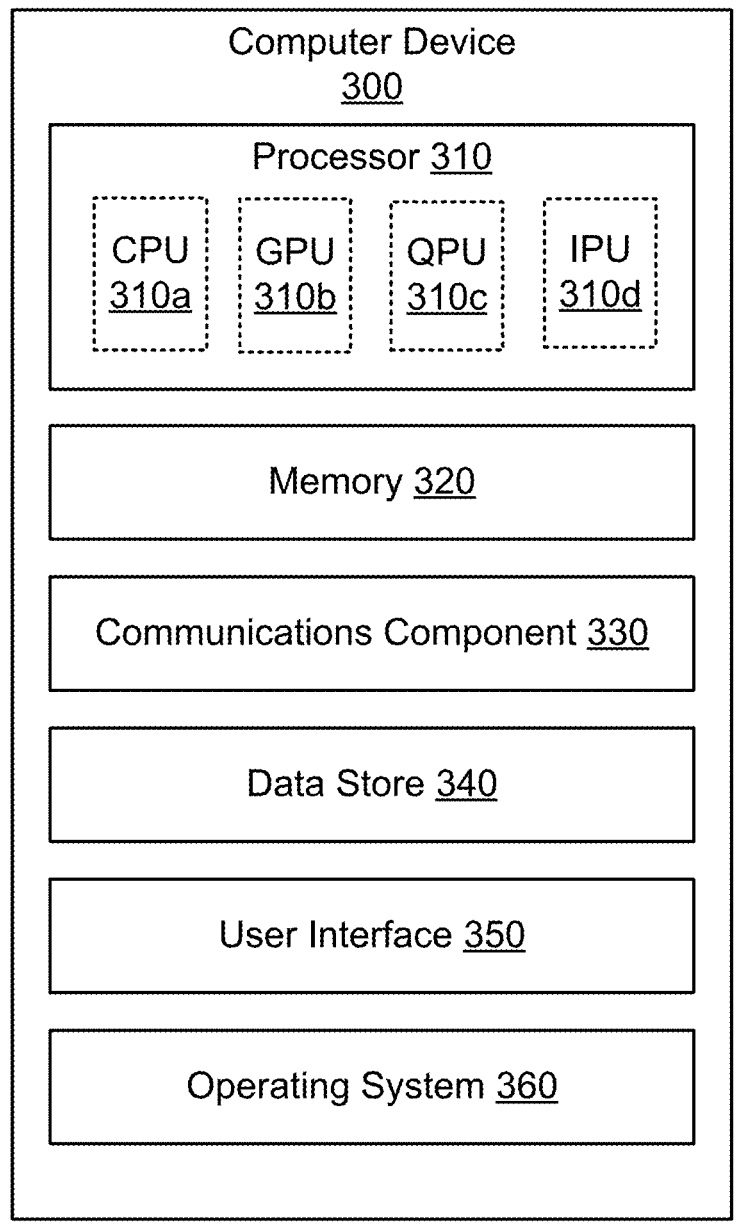
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies. One or more of the QPUs 310c may be fully connected QPUs in accordance with aspects of this disclosure.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, a technique or method for performing by detecting change in images using a quantum computer is described. The quantum image processing technique is primary used to quickly and accurately compare two images. In addition, a quantum computer is able to detect changes in extremely large resolution images quickly and simultaneously. In general, it is noted that the exemplary quantum circuits, which are configured for detecting change in images, as described herein, can be implemented using QIP system 200 of FIG. 2, and, in particular, configuring the qubits in trap 270. In other words and as described above, trap 270 is at the core of the processing operations of the QIP system 200 and holds the atomic-based qubits that are used to perform or implement the quantum operations or simulations, such as the quantum circuits shown in FIGS. 4 through 9A and described in detail below as well as the methods and algorithms shown in FIGS. 10-11 and also described below. In an exemplary aspect, the algorithms component 210 can be configured to perform or implement a stack or sequence of combinations of single qubit operations and/or multi-qubit operations (e.g., two-qubit operations) as well as extended quantum computations to implement the quantum operations according to the exemplary aspect.

There may be several ways to detect changes between two images. The classical method involves comparing all pixels individually to detect a change. However, this method is resource intensive and time consuming since a 4K image may have nearly 4 million individual pixels. In addition, tools may be used to compare two images by using a quantitative similarity or dissimilarity measure. Commonly used measures include the mean squared difference between two images, Pearson's correlation coefficient of the observed image intensities of the two images, entropy of the difference between the two images, and more. However, these measures cannot take into account complicated image structures such as edges.

The disclosure describes a technique of detecting change in images using a QIP system by densely loading the two images onto a quantum circuit using logarithmic means. It is advantageous to use quantum computers to compare two images because quantum computers utilize a very large Hilbert space to encode the image data and features in the image. In addition, quantum computers can process large amounts of data in parallel using the principle of superposition. Therefore, compared to conventional methods of comparing images, not all pixels need to be compared individually. Instead, only the most significant X and Y-axis qubits may be measured which will provide a region-wise change detection up to a desired resolution.

Two images may be considered at a time. A reference image may be a ground truth image, which is considered to be the standard against which a test image will be compared against. The similarity of the two images will be measured using a single scaler with a value constrained between 0 and 1. A value of 1 would indicate that the two images (e.g., reference image and test image) are completely different from each other. A value of 0 would indicate that the two images are identical.

According to an exemplary aspect, the system and method described herein is configured to compare two images that are first loaded onto a quantum circuit (e.g., as described above for FIGS. 2 and 3 by applying lasers to the respective ions in the ion trap) using a FRQI encoding scheme implemented using a QPIXL algorithm within the LCU framework. The quantum state is post-selected on the |1> state of the ancilla which ensures there is a change between the images. The most significant qubits (e.g., up to the resolution required) are then measured to detect region-wise changes since only the regions with changes will produce a large probability distribution.

Figure 4:
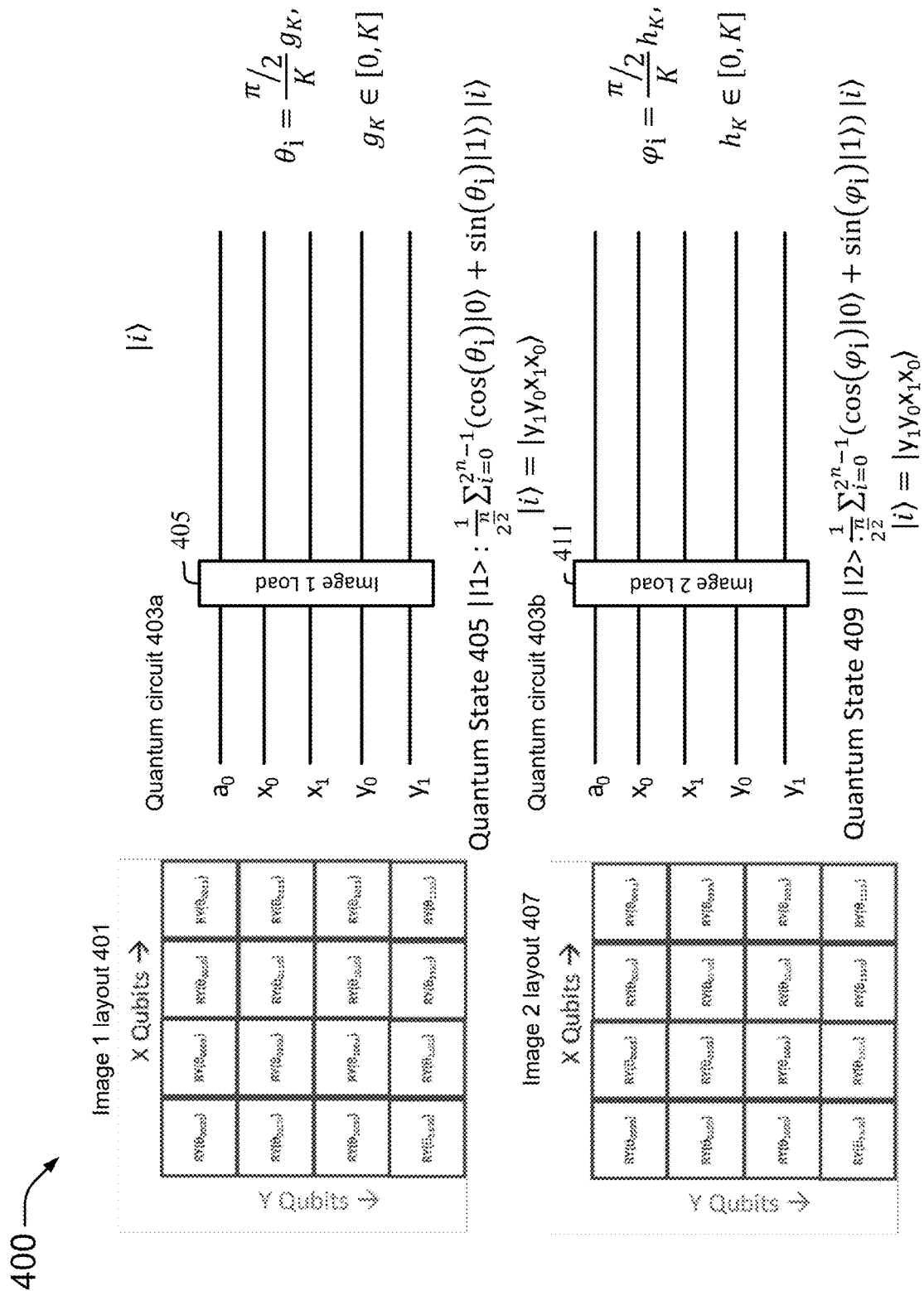
FIG. 4 illustrates an example of QPIXL encoding for detecting change in images using a quantum computer in accordance with aspects of this disclosure.

FIG. 4 illustrates an example of QPIXL encoding for detecting change in images using a quantum computer in accordance with aspects of this disclosure. As noted above, the exemplary quantum circuits can be implemented by QIP system 200 according to an exemplary aspect.

As shown in example 400 of FIG. 4, images (e.g., image 1 and image 2) can be densely loaded onto a quantum circuit 403a and quantum circuit 403b, respectively. In some examples, the image may be loaded onto the quantum circuit using a Flexible Representation of Quantum Images (FRQI) encoding implemented using a Quantum Image Representation (QPIXL) algorithm because the QPIXL algorithm is optimal in qubit and gate count.

In general, FRQI encodes images for representation on quantum computers. Specifically, the FRQI provides a representation of images on quantum computers in the form of a normalized state which captures information about colors and their corresponding positions in the images. Once the FRQI state is achieved, the required Quantum Image Processing algorithm is applied to it which is needed for the specific purpose of carrying out the entire process. The FRQI state represents the classical images, after a transformation, as quantum images on a quantum computer in a normalized state. The FRQI is not only used for image representation, but for various other related tasks of Quantum Image Processing.

QPIXL produces circuits that require fewer quantum gates without introducing additional or ancilla qubits. In addition, the QPIXL framework includes a compression algorithm that further reduces gate complexity by up to 90% without significantly sacrificing quality. An implementation of the QPIXL algorithm is available as part of a Quantum Image Pixel Library (QPIXL++).

As shown in example 400, a reference image may laid out as shown in the Image 1 layout 401. Specifically, Image 1 is shown in the Image 1 layout 401 with 16 pixels. The pixel intensities are shown in smaller boxes within the image such that each small box represents one pixel. The pixels are loaded in superposition and represented by these bit streams. Accordingly, for each bit stream, a bit represents a pixel position. Specifically, the labels $RY(\theta_{0000})$, $RY(\theta_{0001})$, ... $RY(\theta_{1111})$ are the pixel intensities encoded using as angles of the RY single qubit rotations for Image 1. The labels are laid out as they would be represented as the amplitudes of the quantum state. Accordingly, in the quantum state (e.g., |1>), $y_1y_0x_1x_0$ represents the qubit states and in a same order. In some examples, the qubit states are represented in little endian order, which stores the least significant byte at the smallest address.

In FRQI representation, as shown in Quantum State 405, image 1 is stored in a state given by the following:

$$\left|1>:\frac{1}{2^{\frac{n}{2}}}\sum_{i=0}^{2^n-1}\left(\cos(\theta_i)|0\rangle+\sin(\theta_i)|1\rangle\right)|i\rangle\right.$$

in which θ encodes the colors the image and |i> encodes the positions of the pixels in the image.

As shown in example 400, $g_K$ may represent a common pixel format such as a byte image, where the number is stored as a value between 0 and 255. Typically, zero is black and 255 is white and the values in between make up different shades of gray.

Similarly, in the Image 2 layout 407, the images and labels are also laid out in the same way as the Image 1 layout 401, but the angles are represented as $RY(\varphi_{0000})$, $RY(\varphi_{0001})$ ... $RY(\varphi_{1111})$. In addition, the Quantum State 409 for Image 2 is similar to the Quantum State 405 for image 1 except that 0 is replaced with p to denote Image 2.

As shown in example 400, $h_K$ may represent a common pixel format such as a byte image, where the number is stored as a value between 0 and 255. Typically, zero is black and 255 is white and the values in between make up different shades of gray.

The images (e.g., image 1 and image 2) can be densely loaded onto the quantum circuits 403a, 403b with $\log_2(N_{pixels})+1$, respectively. Accordingly, in example 400, five qubits would be needed to represent the entire image with pixel intensities as angles RY rotations of the ancilla qubits denoted as $a_0$. The qubits can be divided into two subsets—qubits $(x_o,x_1)$ that represent the pixels along the x-direction (X Qubits) and qubits $(y_0, y_1)$ that represent the pixels along the y-direction (Y Qubits).

After loading the image on the quantum circuits 403a, 403b, the quantum states (Quantum State 405 and Quantum State 409) are also shown. Specifically, Image 1 405 is loaded onto quantum circuit 403a and Image 2 411 is loaded onto quantum circuit 403b in the states given by the angles θ for Image 1 and φ for Image 2.

Although the example above encodes 16 pixel images in only five qubits, it should be understood that any number of pixel images can be used. For example, a 1024×1024 pixel image may be encoded in 20 qubits. By contrast, a classical algorithm may need a million bits to encode a 1024×1024 pixel image. Thus, only 20 qubits are needed to encode the 1024×1024 qubits due to using quantum computers and a logarithmic compression.

Figure 5:
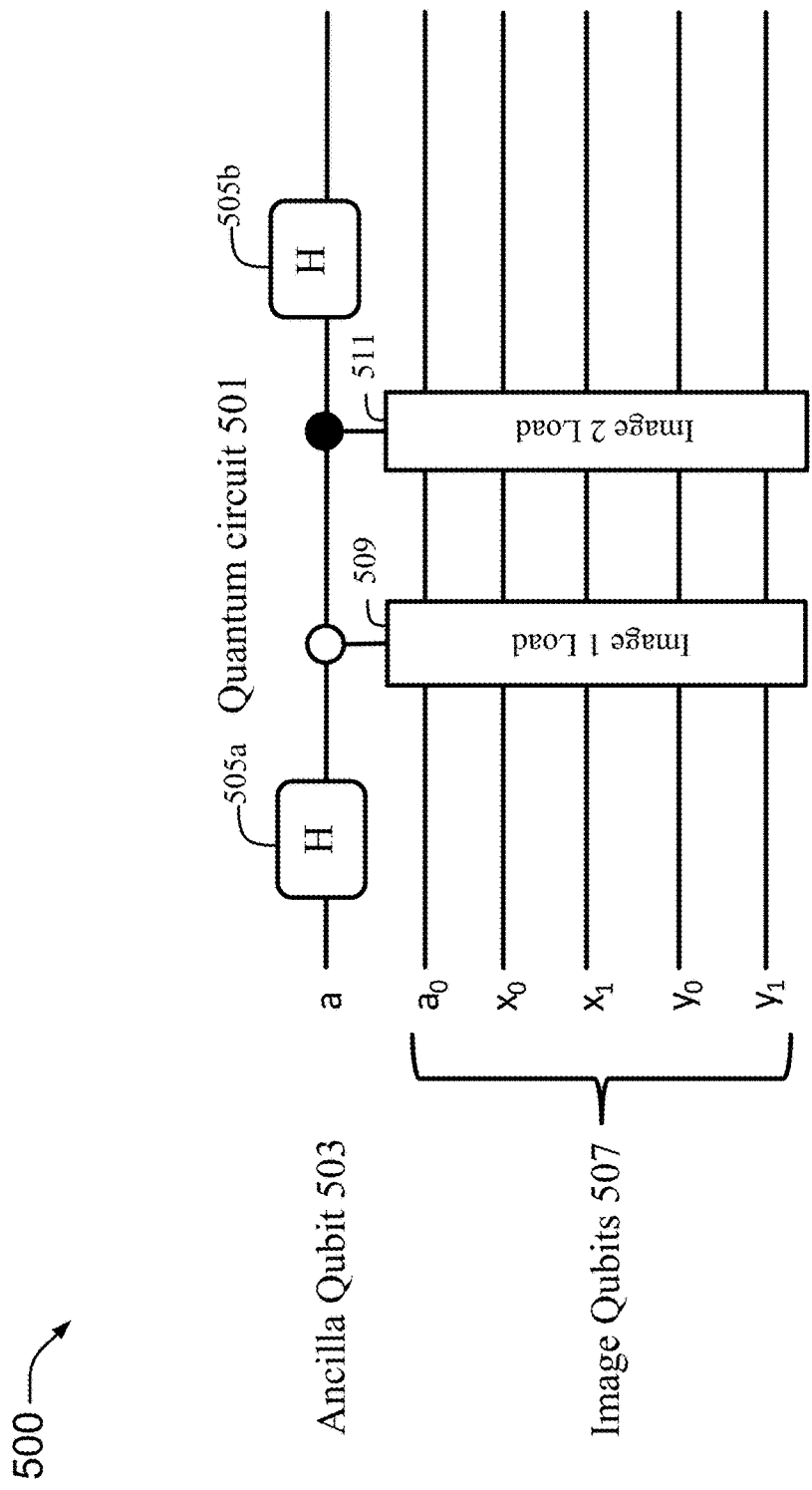
FIG. 5 illustrates an example of a Linear Combination of Unitaries (LCU) circuit for detecting change in images using a quantum computer in accordance with aspects of this disclosure.

FIG. 5 illustrates an example of using a LCU circuit for detecting change in images using a quantum computer in accordance with aspects of this disclosure.

As shown in example 500 of FIG. 5, two images (e.g., a reference image and a test image) are loaded onto a quantum circuit 501 simultaneously as shown as Image 1 Load 509 and Image 2 Load 511. The advantage of this load procedure is that instead of using 10 qubits (5 qubits for image 1 and 5 qubits for image 2, as shown in the two quantum circuits in FIG. 4) to represent 216 pixel images, the load procedure can use 5 qubits for Image 1 loading 509 and Image 2 loading 511 on one quantum computer. The two images are encoded using an additional ancillary qubit ($a_0$). The additional ancilla qubit 503 is denoted as |a⟩ and is put into a uniform superposition of 0 and 1 using a first Hadamard gate 505a. The two images 509, 511 are then loaded on the $\log_2(N_{pixels})+1$ qubits denoted as the image qubits 507, which are conditioned on the |0⟩ and the |1⟩ state of the ancilla qubit |a⟩ 503, respectively. Another Hadamard gate 505b is added after images are loaded 509, 511 on the ancilla qubit 503. This procedure is known as the LCU algorithm.

The quantum state after the application of the last Hadamard gate 505b is:

$$\text{Quantum State:} \frac{1}{2}[(I1+I2)|0\rangle + (I1-I2)|1\rangle]$$

where, I1 and I2 represent the two images encoded using the QPIXL algorithm loaded on the image qubits (e.g., $x_0$, $x_1$, $y_0$, $y_1$). The |0⟩ and |1⟩ state in the above equation corresponds to the ancilla qubit (a). The quantum state before measuring the ancilla qubit is: |a⟩. The ancilla qubit is then measured. If the two images are identical, then the amplitude of the |1⟩ state of the ancilla qubit is 0. Therefore, if the |1⟩ state results upon measurement of the ancilla qubit, then the two images are definitively different, and a change has been detected. If the state |0⟩ is measured, then nothing definitive can be said because the two images may be identical or different.

In some examples, there may be N copies of the quantum circuit and the ancilla qubit may be measured a number of times. In some examples, the number of times may be 10,000 times.

Figure 6:
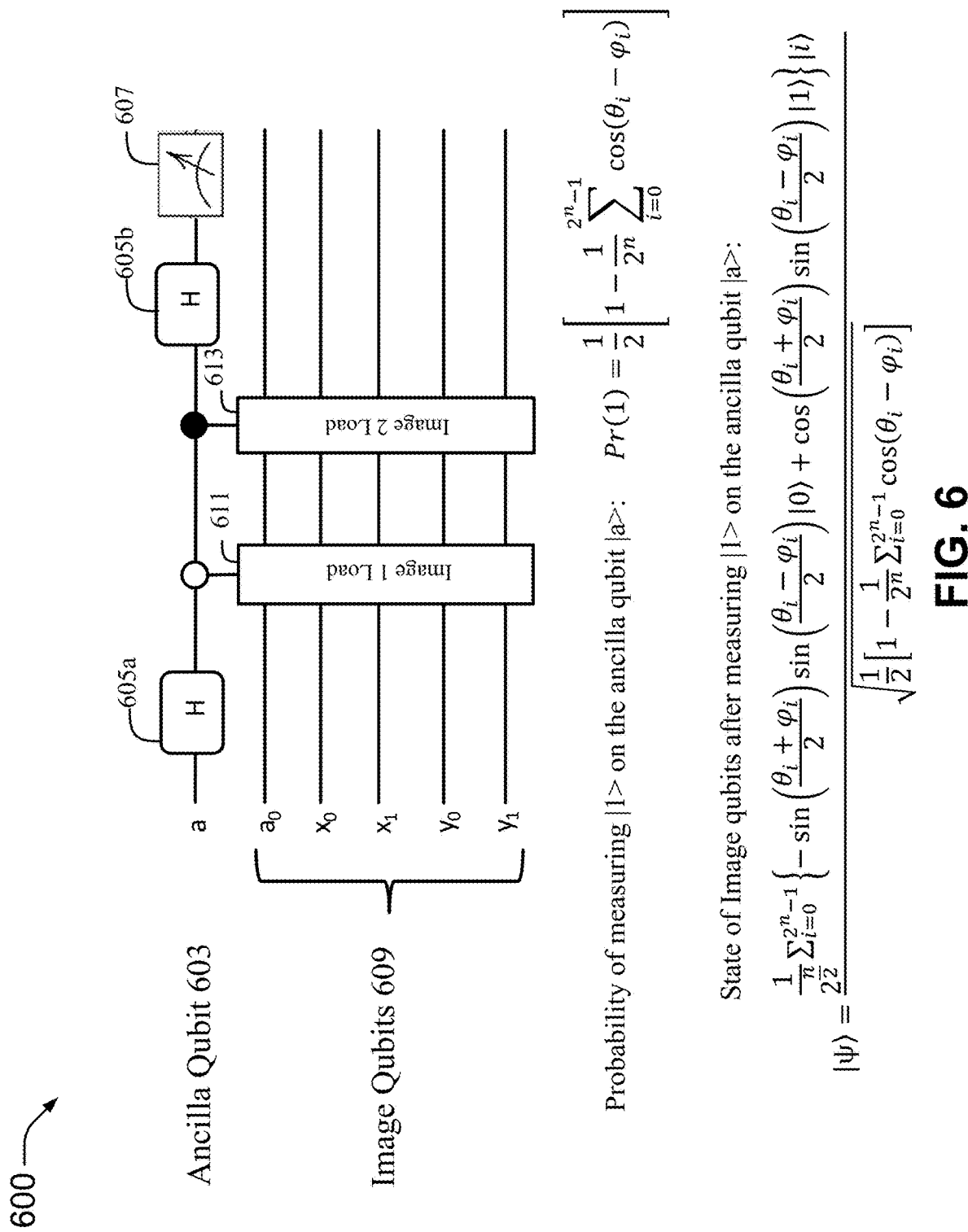
FIG. 6 illustrates an example of ancilla measurements for detecting change in images using a quantum computer in accordance with aspects of this disclosure.

FIG. 6 illustrates an example of ancilla measurements for detecting change in images using a quantum computer in accordance with aspects of this disclosure. Specifically, the state of the image qubits upon measurement of the |1⟩ state on the ancilla is shown in the quantum circuit 600.

The quantum circuit 600 in FIG. 6 shows a probability of measuring the |1⟩ state. For example, assume that the probability 607 of measuring the |1⟩ state is P1. Then, if after N measurements, the |1⟩ state is not seen, then the probability for this is given by: $P=(1-P1)^N=\delta$ Therefore, it can be determined that the number of copies of the quantum circuit that should be created and measured to ensure that the two images are identical with confidence δ is given by $$N \geq \left\lceil \frac{\log\left(\frac{1}{\delta}\right)}{\log\left(\frac{1}{1-P1}\right)} \right\rceil$$

where $\lceil \circ \rceil$ is the ceiling function. If a |1⟩ state is measured, then the measurement process stops and further analysis of the image qubits is performed. The state of image qubits after measuring |1⟩ on the ancilla qubit |a⟩ is:

$$|\psi\rangle = \frac{\frac{1}{2^{\frac{n}{2}}}\sum_{i=0}^{2^n-1}\left\{-\sin\left(\frac{\theta_i+\varphi_i}{2}\right)\sin\left(\frac{\theta_i+\varphi_i}{2}\right)|0\rangle + \cos\left(\frac{\theta_i+\varphi_i}{2}\right)\sin\left(\frac{\theta_i+\varphi_i}{2}\right)|1\rangle\right\}|i\rangle}{\sqrt{\frac{1}{2}\left[1-\frac{1}{2^n}\sum_{i=0}^{2^n-1}\cos(\theta_i-\varphi_i)\right]}}$$

The region qubits (the X qubits and Y qubits as shown in Image 1 layout 401 and Image 2 layout 407 of FIG. 4) encode the state |i⟩ in the equation. As an example such as the image layout of 16 pixels shown in FIG. 4, these states |i⟩ would correspond to |0000⟩, |0001⟩, |0010⟩, |0011⟩ . . . |1111⟩. The amplitude of these states are encoded on the ancilla qubits denoted |$a_0$⟩ 603.

As seen in the equation, the amplitudes of these states are encoded in the phase angle of the rotation gates which encode the pixel intensities. Since the range of the angles is between 0 and pi/2, the value of the function $$\sin\left(\frac{\theta_i+\varphi_i}{2}\right) \in [0, 1/\sqrt{2}].$$

The image qubits 609 are now measured except for the ancilla qubit |$a_0$⟩. The probability of measuring state |i⟩ is shown in FIG. 8. If θ_i−φ_i≈0, then the amplitude of the state |i⟩ is very small. If $\theta_i-\varphi_i$ is large, then the amplitude is large. Thus, those pixels of the two images that are of similar intensity will make the probability of measuring state |i⟩ go to 0 and only those pixels which are very different will produce a large probability of measurement for the state |i⟩. As a reminder, the states |i⟩ encode the pixels in the region |i⟩ of the two images as shown in the image layout in FIG. 4.

An example output probability distribution is shown in FIGS. 9A-9B with some of the states encoding the pixels of different regions of the images having a large probability. This implies that there is a large change between the images in those regions. Other regions have been suppressed implying that there is very little change in those regions. Thus, region-wise change detection may be performed using the procedure outlined.

After determining that there is a change between the two images (e.g., reference image and test image), additionally analysis will be required to determine where exactly in the images the change is detected.

Figure 7:
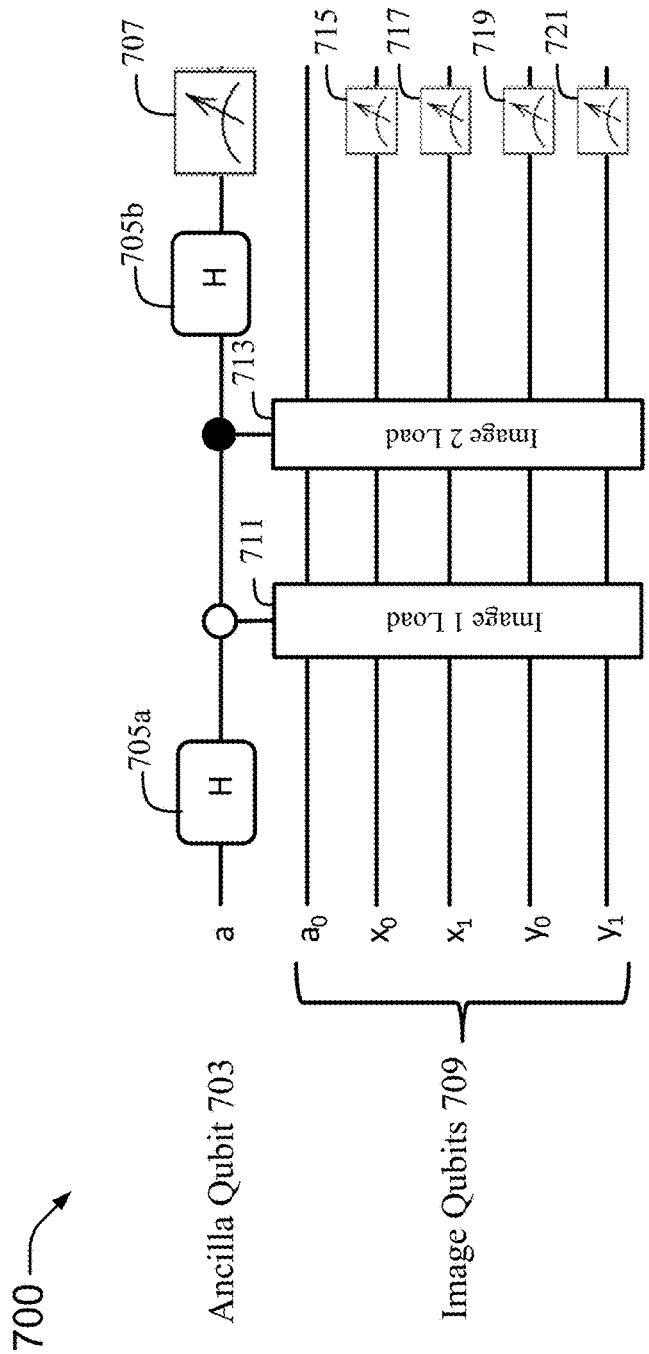
FIG. 7 illustrates an example of image qubits measurements for detecting change in images using a quantum computer in accordance with aspects of this disclosure.

FIG. 7 illustrates an example of image qubits measurements for detecting where the change is in images using a quantum computer in accordance with aspects of this disclosure.

Specifically, the quantum circuit 700 in FIG. 7, determines exactly where in the images that the change is detected by measuring a probability of measuring a specific state i on the four image qubits 709. For example, similar to the equation in FIG. 6, the state of image qubits 709 after measuring |1> 707 on the ancilla qubit |a> 703 is:

$$|\psi\rangle = \frac{\frac{1}{2^{\frac{n}{2}}}\sum_{i=0}^{2^n-1}\left\{-\sin\left(\frac{\theta_i+\varphi_i}{2}\right)\sin\left(\frac{\theta_i+\varphi_i}{2}\right)|0\rangle + \cos\left(\frac{\theta_i+\varphi_i}{2}\right)\sin\left(\frac{\theta_i+\varphi_i}{2}\right)|1\rangle\right\}|i\rangle}{\sqrt{\frac{1}{2}\left[1-\frac{1}{2^n}\sum_{i=0}^{2^n-1}\cos(\theta_i-\varphi_i)\right]}}$$

In particular the equation for measuring the probability of measuring a specific state after measuring the image qubits 709 is:

$$Pr(|i\rangle) = \frac{\left(\sin\left(\frac{\theta_i+\varphi_i}{2}\right)\right)^2}{2^{n-1}\left[1-\frac{1}{2^n}\sum_{k=0}^{2^n-1}\cos(\theta_i+\varphi_i)\right]}$$

If the compared pixels are different, then that will be measured with greater and greater probability. This means that if the pixels between the two images are completely different, then there is a high probability 715, 717, 719, 721 of measuring this. The principle is that we want to know where the images are most different because we do not care about the small changes.

FIG. 8 illustrates an example of output probability distribution for detecting change in images using a quantum computer in accordance with aspects of this disclosure.

The quantum circuit 800 of FIG. 8 shows an example output probability distribution histogram with some of the states encoding the pixels of different regions of the images having a large probability, which implies that there is a large change between the images in those regions. Other regions have been suppressed which implies that there is very little change in those regions.

For example, after measuring the probability of the image qubits 815, 817, 819, 821 an N number of times, a probability histogram 823 may be produced. As shown in the probability histogram 823, only some bit streams are shown and other bit streams are not shown, which most likely indicates that the un shown bit streams were identical since there is little or no probability. The bit streams that are shown (e.g., 0000, 0010, 1000, 0110, 1011, 0001, 0111) indicate that these bit streams were determined to be different. In some examples, the bit streams may be determined to be different by determining whether they exceed a predetermined threshold.

FIG. 9A illustrates an example of an output probability distribution for detecting change in images using a quantum computer in accordance with aspects of this disclosure. Specifically, FIG. 9A shows a process for detecting region-wise change up to a desired resolution by measuring only a subset of image qubits.

Not all pixels need to be compared individually, i.e., not all states |i> need to be measured. For example, an 8K image may have approximately 33 million pixels. It is impractical to measure all of those pixels. Rather, there is no need to measure every pixel and, instead, only larger features are relevant. This is easy to implement on a quantum computer because all four image qubits 909 do not necessarily need to be measured. Instead, only the probability of the most significant X image qubits 907 and Y image qubits 909 may be measured which will provide region-wise change detection up to the desired resolution since the lesser significant qubits will be traced out.

Example 900a shows an example where only the most significant X qubit $xs_1$ and most significant Y qubit $y_1$ from a quantum circuit 901 are measured. This will yield an example probability distribution.

The regions encoded by the measured qubits are shown in the image layout 1 911 indicated by the demarcating thick bold lines. The regions appearing in the probability distribution are also shown in the image layout. Thus, the measurement of the region qubits can be done only up to the resolution required to detect changes between different regions of two images.

In other words, this is similar to dividing the image into four quadrants and only measuring the $X_1$ and $Y_1$ so it is equivalent to measuring the whole region 915. This is also the reason why the probability histogram 913 only shows four bitstreams instead of 16 bitstreams.

Based on the probability histogram 913, the 01 region has the highest probability and, as such, is said to have the largest change happening. This means that the 01 region should be the area of focus since it has the highest probability and other regions may be discarded because there is most likely not much change in those regions.

As an example, assuming that a very large image has been loaded on a quantum circuit with 100 X qubits and 100 Y qubits. The process begins by measuring from the top (e.g., largest X and largest Y) and then dividing the image into four regions. Based on a predetermined probability threshold, it may be determined that regions 01 and 10 pass the predetermined probability threshold and regions 00 and 11 do not. If the regions are below the predetermined probability threshold, then those regions may be discarded because there may not be much change in those regions. Accordingly, the particular regions that do pass the not threshold will be of interest and the next qubits should be measured, which splits the regions into four more and the process continues in a recursive way until the region size is determined to be less than a preset resolution.

In some examples, a preset resolution threshold may be set such that the process does not care about any minute differences between 256×256 resolution. Accordingly, if the baseline is 256×256, then measurements will not be taken for any qubits below the baseline. Instead, that region can be scanned such that changes that have been taken place may be identified. In some examples, this may then be fed into a classical neural network for classification.

FIG. 9B illustrates an example of measuring regions that are not powers of two in accordance with aspects of this disclosure.

The regions encoded by the measured qubits are shown in the image 1 layout on the right 919 indicated by the demarcating bold lines. The regions appearing in the probability distribution are also shown in the image 1 layout 919. Thus, the measurement of the region qubits can be performed only up to the resolution required to detect changes between different regions of two images.

Accordingly, to measure regions that are not in fractions of two, the image underneath may be translated periodically. The same procedure described in FIG. 9A is performed and then bifurcated again according to the region.

FIG. 10 illustrates a flow chart describing a method of detection change in regions of an image. Specifically, the method 1000 in FIG. 10 describes an overall flow process of detecting change in two images using a quantum computer without comparing all pixels individually.

At step 1002, the method 1000 may include loading a reference image and a test image onto a quantum circuit. Step 1002 is described in more detail in FIGS. 4 and 5. At step 1004, the method 1000 may include measuring an ancilla qubit and post select on |1>. Step 1004 is described in more detail in FIG. 6.

At step 1006, the method 1000 may include determining whether the probability of |1> is greater than a threshold. If it is determined that the probability of |1> is not greater than the threshold, then, at step 1016, the method 1000 may include determining that the two images are identical up to a threshold. Step 1006 is described in more detail in FIGS. 6 and 7. If it is determined that the probability of |1> is greater than the threshold, then the method 1000 continues to step 1008.

The measurement of the ancilla |a> giving a state |1> confirms that the test image is different from the reference image. The measurement of the image qubit is for further determination of which regions of the two images are different. In other words, if the measurement of the ancilla |a> gives the state |1>, it definitely means that there is a difference between the two images, but there is not enough information to tell where in the images the difference lies. Accordingly, the measurement of the image qubits will further narrow down the region with the differences.

At step 1008, the method 1000 may include measuring the most significant X and Y image qubits.

At step 1010, the method 1000 may include selecting regions with a probability greater than a threshold.

At step 1012, the method 1000 may include determining whether the region size is greater than the required resolution. If it is determined that the region size is not greater than the required resolution, then, at step 1014, the method 1000 may include discarding measured qubits. If is determined that the region size is greater than the required resolution, then, at step 1018, the method 1000 may include detecting regions of change. Steps 1008, 1010, 1012, and 1014 are described in more detail in FIG. 9A.

FIG. 11 illustrates a flow chart describing a method of detection change in regions of an image.

At operation 1102, the method 1100 may include implementing a quantum circuit in the QIP system, the quantum circuit comprising at least an ancilla qubit denoted as |a> which is put into a uniform superposition using a Hadamard gate and n number of qubits denoted as image qubits conditions on a |0> state and a|1> state of the ancilla qubit |a>, where n may correspond to ceil(log 2(N))+1 and N corresponds to a total number of pixels in a reference image.

At operation 1104, the method 1100 may include loading the reference image and a test image onto image qubits controlled on the |0> state and the |1> state of the ancilla qubit |a> in the quantum circuit such that pixels from the reference and test images are loaded in superposition. Another Hadamard gate may be added after loading the reference and test images on the ancilla qubit. In some examples, the reference image and the test image may be loaded onto the quantum circuit using a quantum pixel representation (QPIXL) algorithm. The image qubits may be divided into a first subset to represent pixels of images along an X axis and a second subset to represent the pixels along a Y axis. As an example, referring back to FIG. 4, an image may contain an image 1 layout 401 such that the image qubits are divided to represent pixels along an X axis and pixels along an Y axis.

As an example, referring back to FIG. 5, the quantum circuit 501 may comprise of an ancilla qubit 503 (denoted as |a>) put into a uniform superposition of 0 and 1 using a first Hadamard gate 505*a*, the two images 509 and 511 are then loaded on the log 2 ($N_{pixels}$)+1 qubits denoted as image qubits 507, which are conditioned on the |0> and the |1> state of the ancilla qubit |a> 503, respectively, and another Hadamard 505*b* gate is added after the image loading 509, 511 on the ancilla qubit 503.

In some examples, each pixel may comprise a bitstream representing pixel intensity. In some examples, each pixel in the reference and test images may each be labeled with pixel intensities encoded as angles of an RY single qubit rotations in a bitstream such that the labels are generated to represent amplitudes of the quantum state.

At operation 1106, the method 1100 may include determining a state of the image qubits after measuring |1> on the ancilla qubit for a predetermined number of times on multiple copies of the implemented quantum circuit. The reference image may be detected to be different from the test image when the state of the ancilla qubit measures |1>.

As an example, referring back to FIG. 6, the quantum circuit 600 shows a probability 607 of measuring |1> on the ancilla qubit 603 as:

$$Pr(1) = \frac{1}{2}\left[1 - \frac{1}{2^n}\sum_{i=0}^{2^n-1}\cos(\theta_i + \varphi_i)\right].$$

In addition, the quantum circuit 600 also shows the probability of measuring |1> on the ancilla qubit |a> as:

$$|\psi\rangle = \frac{\frac{1}{2^{\frac{n}{2}}}\sum_{i=0}^{2^n-1}\left\{-\sin\left(\frac{\theta_i+\varphi_i}{2}\right)\sin\left(\frac{\theta_i+\varphi_i}{2}\right)|0\rangle + \cos\left(\frac{\theta_i+\varphi_i}{2}\right)\sin\left(\frac{\theta_i+\varphi_i}{2}\right)|1\rangle\right\}|i\rangle}{\sqrt{\frac{1}{2}\left[1-\frac{1}{2^n}\sum_{i=0}^{2^n-1}\cos(\theta_i-\varphi_i)\right]}}$$

Optionally, at operation 1108, the method 1100 may include determining whether a probability of measuring quantum state |i> after measuring the image qubits is greater than a probability threshold. The probability may correspond to a single scalar value between 0 and 1 such that 1 indicates that the test image is different than the reference image and 0 indicates that the test image is same as the reference image.

As an example, referring back to FIG. 6, the quantum circuit 600 shows the state of image qubits after measuring |1> on the ancilla qubit |a> as:

$$|\psi\rangle = \frac{\frac{1}{2^{\frac{n}{2}}}\sum_{i=0}^{2^n-1}\left\{-\sin\left(\frac{\theta_i+\varphi_i}{2}\right)\sin\left(\frac{\theta_i+\varphi_i}{2}\right)|0\rangle + \cos\left(\frac{\theta_i+\varphi_i}{2}\right)\sin\left(\frac{\theta_i+\varphi_i}{2}\right)|1\rangle\right\}|i\rangle}{\sqrt{\frac{1}{2}\left[1-\frac{1}{2^n}\sum_{i=0}^{2^n-1}\cos(\theta_i-\varphi_i)\right]}}$$

In some examples, determining whether the probability of measuring quantum state |i> after measuring the image qubits is greater than the probability threshold may further include: measuring a probability for a most significant X image qubit from the first subset and a most significant Y image qubit from the second subset; selecting regions of the reference image with a measured probability greater than the probability threshold; for each selected region, determining whether a region size is greater than a preset resolution threshold for detecting change between different regions of the reference and test images; and based on a determination that the determined region size is greater than the preset resolution threshold, detect that the test image is different from the reference image in the selected region.

As an example, referring back to FIG. 9A, example 900a shows a process for detecting region-wise change up to a desired resolution threshold by measuring only the most significant X qubits 907 and the most significant Y qubits 909.

In some examples, based on a determination that the probability is greater than the probability threshold, detecting that the test image is different from the reference image, measuring a probability for a most significant X image qubit from the first subset and a most significant Y image qubit from the second subset; determine whether region sizes produced from the most significant X and Y image qubits are greater than a threshold for that region; based on a determination that the region sizes are greater than the threshold for that region, perform a narrowing procedure comprising: determining if a probability is greater than the probability threshold for that region, continue measuring a next most significant X image qubit from the first subset and a next most significant Y image qubits from the second subset, and continue performing the narrowing procedure until the region size is determined to be less than the preset resolution; and based on the probability of measuring a certain region being less than the threshold for that region, determine that the certain region is identical up to the preset resolution threshold between the reference image and the test image.

Optionally, at operation 1110, the method 1100 may include, based on a determination that the probability is greater than the probability threshold, detecting that the test image is different from the reference image.

In some examples, the method 1100 may include, based on a determination that the probability is less than or equal to the probability threshold, detect that the test image is identical to the reference image up to a preset resolution threshold.

In some examples, based on a determination that selected regions do not correspond to fractions of powers of two of the test image, perform a translation function for the reference and test images with a periodic wrapping around borders of the reference and test images before loading the reference image and a test image onto image qubits.

As an example, referring back to FIG. 9B, example 900b shows a process for measuring regions of an image that are not powers of two by performing a translation periodically.

In some examples, the method 1100 may include outputting an output probability distribution showing the quantum states encoding pixels of different regions.

As an example, referring back to FIG. 8, after measuring the probability an N number of times, a probability histogram 823 may be outputted such that the bit streams that are shown (e.g., 0000, 0010, 1000, 0110, 1011, 0001, 0111) in the probability histogram 823 indicate that these bit streams were determined to be different.

This disclosure provides a technique to detect change in images using quantum computers without comparing all pixels individually. In addition, only a most M significant X and Y qubits may be measured which will provide region-wise change detection up to a desired resolution since lesser significant qubits may be discarded. The goal is to utilize these techniques described above to process large amounts of data in parallel using the principle of superposition. In addition, quantum computers may utilize a very large Hilbert space to encode the image data and features in the image.

It is to be understand that while this disclosure describes a technique to detect change in images of 16 pixels, the disclosure need not be so limited. The techniques or approach described herein is also applicable to be used on images with any number of pixels or resolution. The technique is particularly beneficial to extremely large images due to the images being densely loaded onto a quantum circuit.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for detecting changes in images using a quantum information processing (QIP) system, the method comprising:

implementing a quantum circuit in the QIP system, the quantum circuit comprising at least an ancilla qubit denoted as |a> which is put into a uniform superposition using a Hadamard gate and n number of qubits denoted as image qubit conditions on a |0> state and a |1> state of the ancilla qubit |a>, wherein n corresponds to $\text{ceil}(\log_2(N))+1$ and N corresponds to a total number of pixels in a reference image;

loading the reference image and a test image onto image qubits controlled on the |0> state and the |1> state of the ancilla qubit |a> in the quantum circuit such that pixels from the reference and test images are loaded in superposition, wherein another Hadamard gate is added after loading the reference and test images on the ancilla qubit, wherein image qubits are divided into a first subset to represent pixels of images along an X axis and a second subset to represent the pixels along a Y axis; and determining a state of the image qubits after measuring |1> on the ancilla qubit for a predetermined number of times, wherein the reference image is detected to be different from the test image when the state of the ancilla qubit measures |1>.

2. The method of claim 1, further comprising:

determining whether a probability of measuring quantum state |i> after measuring the image qubits is greater than a probability threshold, wherein the probability corresponds to a single scalar value between 0 and 1 such that 1 indicates that the test image is different than the reference image and 0 indicates that the test image is same as the reference image; and based on a determination that the probability is greater than the probability threshold, detecting that the test image is different from the reference image.

3. The method of claim 2, further comprising:
based on a determination that the probability is less than or equal to the probability threshold, detecting that the test image is identical to the reference image up to a preset resolution threshold.

4. The method of claim 2, determining whether the probability of measuring quantum state $|i\rangle$ after measuring the image qubits is greater than the probability threshold further comprises:
measuring a probability for a most significant X image qubit from the first subset and a most significant Y image qubit from the second subset;
selecting regions of the reference image with a measured probability greater than the probability threshold;
for each selected region, determining whether a region size is greater than a preset resolution threshold for detecting change between different regions of the reference and test images; and
based on a determination that the determined region size is greater than the preset resolution threshold, detecting that the test image is different from the reference image in the selected region.

5. The method of claim 4, further comprising:
based on a determination that the probability is greater than the probability threshold, detecting that the test image is different from the reference image,
measuring a probability for a most significant X image qubit from the first subset and a most significant Y image qubit from the second subset;
determining whether region sizes produced from the most significant X and Y image qubits are greater than a threshold for that region;
based on a determination that the region sizes are greater than the threshold for that region, perform a narrowing procedure comprising:
determining if a probability is greater than the probability threshold for that region,
continuing measuring a next most significant X image qubit from the first subset and a next most significant Y image qubits from the second subset, and
continuing performing the narrowing procedure until the region size is determined to be less than the preset resolution; and
based on the probability of measuring a certain region being less than the threshold for that region, determining that the certain region is identical up to the preset resolution threshold between the reference image and the test image.

6. The method of claim 4, further comprising:
based on a determination that selected regions do not correspond to fractions of powers of two of the test image, performing a translation function for the reference and test images with a periodic wrapping around borders of the reference and test images before loading the reference image and a test image onto image qubits.

7. The method of claim 1, wherein each pixel comprises a bitstream representing pixel intensity.

8. The method of claim 1, wherein each pixel in the reference and test images are each labeled with pixel intensities encoded as angles of an RY single qubit rotations in a bitstream such that the labels are generated to represent amplitudes of the quantum state.

9. The method of claim 1, further comprising:
outputting an output probability distribution showing the quantum states encoding pixels of different regions.

10. The method of claim 1, wherein the reference image and the test image are loaded onto the quantum circuit using a quantum pixel representation (QPIXL) algorithm.

11. The method of claim 1, wherein implementing the quantum circuit in the QIP system comprises implementing the quantum circuit using atoms or ions in a trap of the QIP system.

12. A quantum information processing (QIP) system for detecting changes in images, comprising:
a change detection component configured to control one or more components of the QIP system to:
implement a quantum circuit in the QIP system, the quantum circuit comprising at least an ancilla qubit denoted as $|a\rangle$ which is put into a uniform superposition using a Hadamard gate and n number of qubits denoted as image qubits conditions on a $|0\rangle$ state and a $|1\rangle$ state of the ancilla qubit $|a\rangle$, wherein n corresponds to ceil($\log_2(N)$)+1 and N corresponds to a total number of pixels in a reference image, wherein the image qubits are divided in a first subset to represent pixels of images along an X axis and a second subset to represent the pixels along a Y axis;
load the reference image and a test image onto the image qubits controlled on the $|0\rangle$ state and the $|1\rangle$ state of the ancilla qubit $|a\rangle$ in the quantum circuit such that pixels from the reference and test images are loaded in superposition, wherein another Hadamard gate is added after loading the reference and test images on the ancilla qubit; and
determine a state of the image qubits after measuring $|1\rangle$ on the ancilla qubit for a predetermined number of times on multiple copies of the quantum circuit, wherein the reference image is detected to be different from the test image when the state of the ancilla qubit measures $|1\rangle$.

13. The QIP system of claim 12, wherein the change detection component is further configured to control one or more components of the QIP system to:
determine whether a probability of measuring quantum state $|i\rangle$ after measuring the image qubits is greater than a probability threshold, wherein the probability corresponds to a single scalar value between 0 and 1 such that 1 indicates that the test image is different than the reference image and 0 indicates that the test image is same as the reference image; and
based on a determination that the probability is greater than the probability threshold, detect that the test image is different from the reference image.

14. The QIP system of claim 13, wherein the change detection component is further configured to control one or more components of the QIP system to:
based on a determination that the probability is less than or equal to the probability threshold, detect that the test image is identical to the reference image up to a preset resolution threshold.

15. The QIP system of claim 13, wherein determining whether the probability of measuring quantum state $|i\rangle$ after measuring the image qubits is greater than the probability threshold further comprises:
measuring a probability for a most significant X image qubit from the first subset and a most significant Y image qubit from the second subset;
selecting regions of the reference image with a measured probability greater than the probability threshold;
for each selected region, determining whether a region size is greater than a preset resolution threshold for detecting change between different regions of the reference and test images; and based on a determination that the determined region size is greater than the preset resolution threshold, detect that the test image is different from the reference image in the selected region.

16. The QIP system of claim 15, wherein the change detection component is further configured to control one or more components of the QIP system to:

based on a determination that the probability is greater than the probability threshold, detect that the test image is different from the reference image, measure a probability for a most significant X image qubit from the first subset and a most significant Y image qubit from the second subset;

determine whether region sizes produced from the most significant X and Y image qubits are greater than a threshold for that region;

based on a determination that the region sizes are greater than the threshold for that region, perform a narrowing procedure comprising:

determining if a probability is greater than the probability threshold for that region, continue measuring a next most significant X image qubit from the first subset and a next most significant Y image qubits from the second subset, and continue performing the narrowing procedure until the region size is determined to be less than the preset resolution; and based on the probability of measuring a certain region being less than the threshold for that region, determine that the certain region is identical up to the preset resolution threshold between the reference image and the test image.

17. The QIP system of claim 12, wherein each pixel comprises a bitstream representing pixel intensity.

18. The QIP system of claim 12, wherein each pixel in the reference and test images are each labeled with pixel intensities encoded as angles of an RY single qubit rotations in a bitstream such that the labels are generated to represent amplitudes of the quantum state.

19. The QIP system of claim 12, wherein the change detection component is further configured to control one or more components of the QIP system to:

output an output probability distribution showing the quantum states encoding pixels of different regions.

20. A non-transitory computer-readable medium storing executable instructions that, upon execution, causes a processor to map a quantum program code to a multi-core quantum computing system by performing functions comprising:

implementing a quantum circuit in the multi-core quantum computing system, the quantum circuit comprising at least an ancilla qubit denoted as $|a\rangle$ which is put into a uniform superposition using a Hadamard gate and n number of qubits denoted as image qubits conditions on a $|0\rangle$ state and a $|1\rangle$ state of the ancilla qubit $|a\rangle$, wherein n corresponds to ceil($\log_2(N)$)+1 and N corresponds to a total number of pixels in a reference image, wherein the image qubits are divided in a first subset to represent pixels of images along an X axis and a second subset to represent the pixels along a Y axis;

loading the reference image and a test image onto the image qubits controlled on the $|0\rangle$ state and the $|1\rangle$ state of the ancilla qubit $|a\rangle$ in the quantum circuit such that pixels from the reference and test images are loaded in superposition, wherein another Hadamard gate is added after loading the reference and test images on the ancilla qubit; and determining a state of the image qubits after measuring $|1\rangle$ on the ancilla qubit for a predetermined number of times on multiple copies of the implemented quantum circuit, wherein the reference image is detected to be different from the test image when the state of the ancilla qubit measures $|1\rangle$.

* * * * *